UNITED STATES PATENT OFFICE.

EMIL JAHR, OF BERLIN, GERMANY.

METHOD OF UTILIZING ELECTRICAL EARTH-CURRENTS.

SPECIFICATION forming part of Letters Patent No. 690,151, dated December 31, 1901.

Application filed July 24, 1900. Serial No. 24,680. (No specimens.)

*To all whom it may concern:*

Be it known that I, EMIL JAHR, a subject of the King of Prussia, German Emperor, residing at Berlin, in the Kingdom of Prussia and German Empire, have invented certain new and useful Improvements in Methods of Utilizing Electrical Earth-Currents, (for which I have applied for patents in England, No. 9,971, dated May 30, 1900; in France, No. 289,156, dated June 2, 1900; in Belgium, No. 118,752, dated June 2, 1900; in Germany, dated May 26, 1900, and in Russia, dated June 5, 1900,) of which the following is a specification.

It is known that continuous electric currents flow through the solid and liquid portions of the earth's crust. Lamont (*Der Erdstrom und der Zusammenhang desselben mit dem Erdmagnetismus*, Leipsic, 1862) showed the existence of such currents by thrusting two metal plates at a certain distance from each other into the ground in the direction of the magnetic or astronomical meridian and connecting them above the ground by means of a wire including a galvanometer. The stronger currents of this kind have been shown to flow from south to north. Later observations (Weinstein, *Electrotechnische Zeitschrift*, 1898, p. 794) show that this so-called "earth-current" possesses a considerable uniformity of current strength and pressure. From the fact that this earth-current flows from south to north it may be concluded that its pressure will increase if starting from a given point in the south the distance between this and the northern point is increased, provided the connecting-lead be of little resistance. Notwithstanding that these facts have been known the earth-current has never been utilized, because in order to obtain a sufficient current the distance between the north and south points must be so great that the cost of an installation is prohibitive. I have discovered that the south to north direction of the earth-current is maintained only when the plates are of the same metal. When zinc is used for the southern plate and iron or carbon for the northern one, the current flows through the lead connecting them from north to south. All the common metals behave relatively similarly—that is, the current flows always from that plate whose position in the ordinary electrical potential series is near the negative end, (palladium.) I have also discovered that the current produced is of highest tension when the two metals are most widely separated from each other in the electrical potential series and that which is nearer to the positive end (zinc) of this series is thrust into earth or water at the more northerly point, while that which is nearer the negative end (palladium) of the series is thrust into earth or water at the southerly point. In such an arrangement the metals are not appreciably chemically corroded, even when they are in earth saturated with water, and are connected together by lead for a long time.

My invention relates, therefore, to a method for utilizing the earth-current, consisting in thrusting into the earth or water on the earth two electrodes, of which the one has a position north of the other and is of a material nearer to the positive end (zinc) of the electrical potential series than is the material of the other electrode and connecting the two above ground by a lead. It is advantageous that the northerly more electropositive electrode should be thrust more deeply into the earth or water than the southerly electrode, for then the current is stronger. The best result as to strength of current and pressure is obtained when this difference in depth is such that a line joining the two electrodes is in the direction of the magnetic dip. The best effect, therefore, is obtained when these conditions are combined—namely, when the two electrodes are approximately in the magnetic meridian and are of materials widely separated in the electrical potential series and the northerly and more electropositive electrode is buried at a greater depth than that at which the southerly electrode is buried and that a line joining them has the inclination of the magnetic dip. The current can be tapped from the lead joining the electrodes and utilized in any well-known manner.

What I claim, and desire to secure by Letters Patent of the United States, is—

1. A method of utilizing electrical earth-currents consisting in placing electrodes occupying different positions in the electrical potential series into the earth or water so that the electrode which is nearer the negative end of the series is at the more southerly point, while the electrode which is nearer to the positive is at the more northerly point, and connecting the two electrodes together by a lead, the northern electrode being inserted deeper into the earth or water than the southern one, substantially as described.

2. A method of utilizing electrical earth-currents consisting in placing electrodes occupying different positions in the electrical potential series into the earth or water so that the electrode which is nearer the negative end of the series is at the more southerly point, while the electrode which is nearer to the positive is at the more northerly point, and connecting the two electrodes together by a lead, the insertion of the electrodes into the earth or water at such heights that a line connecting the same is situated in the direction from north to south, and also in the direction of the magnetic dip, substantially as described.

In testimony whereof I have hereunto set my hand in the presence of two witnesses.

EMIL JAHR.

Witnesses:
WOLDEMAR HAUPT,
HENRY HASPER.